United States Patent [19]

Pareau et al.

[11] Patent Number: 5,411,725
[45] Date of Patent: May 2, 1995

[54] PROCESS FOR THE CONTINUOUS CONVERSION OF ONE HYDROXYLAMINE SALT TO ANOTHER HYDROXYLAMINE SALT

[75] Inventors: Dominique Pareau, Verrieres le Buisson; Andre Chesne, Le Vesinet; Gerard Durand, Le Pecq; Michel DeRubercy, Le Vesinet, all of France

[73] Assignee: Societe Generale Pour les Techniques Nouvelles, SGN, Saint Quentin en Yvelines, France

[21] Appl. No.: 138,587

[22] Filed: Oct. 18, 1993

[30] Foreign Application Priority Data

Oct. 19, 1992 [FR] France ................................ 92 12485

[51] Int. Cl.⁶ ..................... C01B 21/20; C07C 51/41
[52] U.S. Cl. ..................................... 423/387; 423/395; 423/398; 562/609
[58] Field of Search ........................ 423/387, 398, 395; 564/300, 301; 562/609

[56] References Cited

U.S. PATENT DOCUMENTS 3,695,834 10/1972 Wheelwright ...................... 423/395

FOREIGN PATENT DOCUMENTS

| 2111277 | 2/1972 | France . |
| 2206270 | 7/1974 | France . |
| 2243904 | 11/1975 | France . |
| 1423886 | 11/1972 | United Kingdom . |
| 1427689 | 9/1974 | United Kingdom . |
| 1423886 | 2/1976 | United Kingdom . |

*Primary Examiner*—Peter O'Sullivan
*Attorney, Agent, or Firm*—Graham & James

[57] ABSTRACT

The present invention relates to a process for the continuous conversion of one hydroxylamine salt to another hydroxylamine salt, said process involving a countercurrent liquid-liquid extraction followed by a countercurrent liquid-liquid re-extraction. Characteristically, the extractant is used in the extraction step in the salified form and in the acid form.

17 Claims, 2 Drawing Sheets

PROCESS FOR THE CONTINUOUS CONVERSION OF ONE HYDROXYLAMINE SALT TO ANOTHER HYDROXYLAMINE SALT

The present invention relates to a process for the continuous conversion of one hydroxylamine salt to another hydroxylamine salt, which is applicable especially to the conversion of hydroxylamine sulfate or chloride to hydroxylamine nitrate or formate.

It is known that the reprocessing of irradiated nuclear fuels necessitates the use of certain reducing agents such as hydroxylamine salts. Hydroxylamine nitrate and formate, inter aliat are particularly valuable for this purpose. Unfortunately, said salts have a low stability and are costly.

According to the invention, an advantageous process for the preparation of such salts is proposed.

Said process is an improvement to the process described in patent application FR-A-2 206 270.

According to the teaching of said patent application, a countercurrent liquid-liquid extraction and then a countercurrent liquid-liquid re-extraction are carried out successively with an organic solvent containing an extractant for the hydroxylamine cation.

During this extraction, the extractant is used in the normal form or in the salified form. It is advantageous to use di-2-ethylhexylphosphoric acid in the form of its sodium salt, said salt having been generated by bringing said acid into contact, in countercurrent, with a solution of sodium carbonate.

Figure 1:
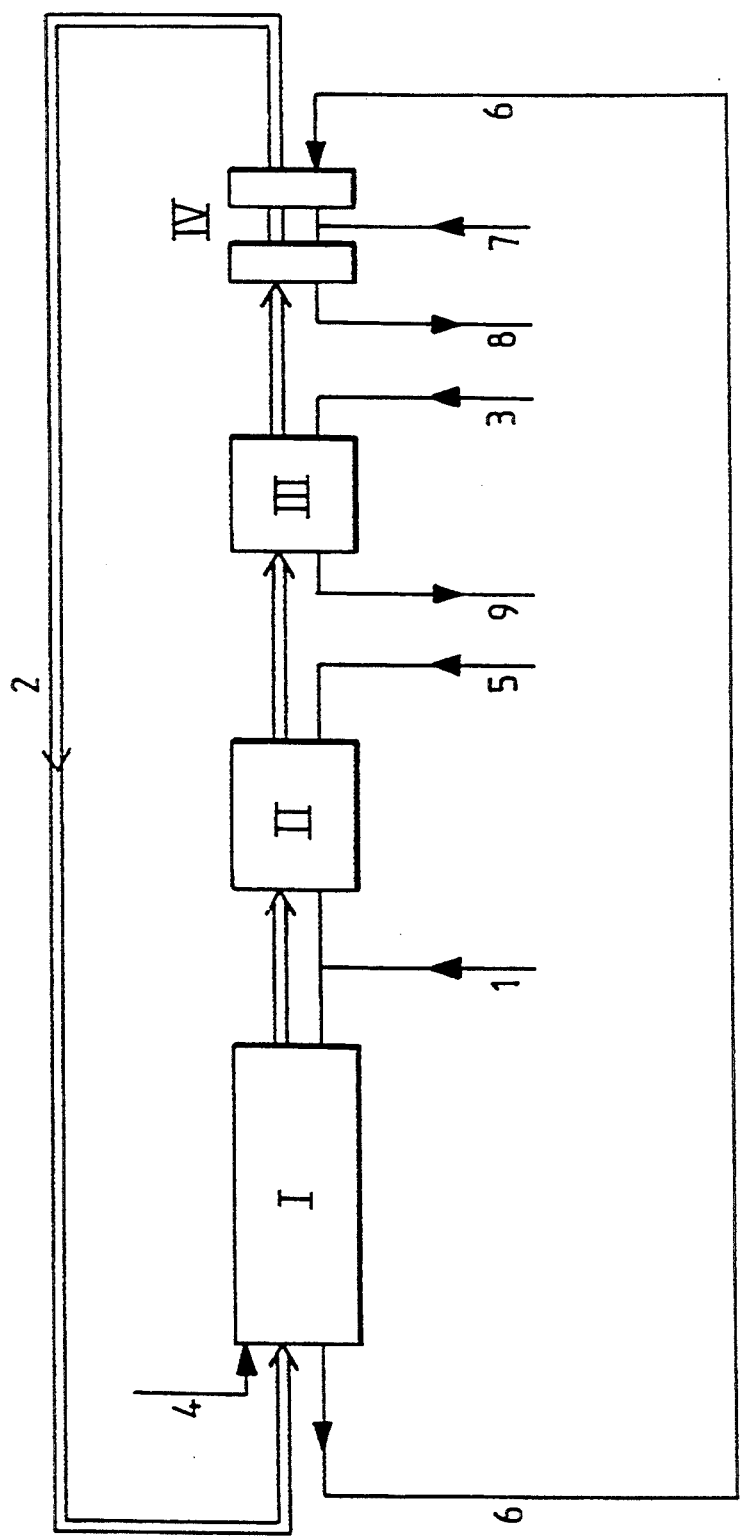
FIG. 1 illustrates a first preferred variant of said process.

According to a first feature of the present invention, Applicants have demonstrated the value of using the extractant in the acid form and in the salified form.

The process of the invention therefore consists of a process for the continuous conversion of one hydroxylamine salt to another hydroxylamine salt. It is applicable especially to the conversion of hydroxylamine sulfate or chloride to hydroxylamine nitrate or formate and very particularly to the conversion of said sulfate to said nitrate. It comprises the following steps:
  extraction of the hydroxylamine cation from the initial salt solution by bringing said solution into contact, in countercurrent, with a solvent containing an extractant for said hydroxylamine cation (liquid-liquid extraction);
  re-extraction of said cation by bringing said solvent containing the extractant charged with said cation into contact, in countercurrent, with an aqueous solution whose anion is that of the hydroxylamine salt which it is desired to obtain (liquid-liquid extraction); and
  recycling of said solvent containing the extractant, after basic regeneration (salification) of the latter.

In this process, said extraction is carried out with a partially salified extractant. Characteristically, in the process of the invention, the extractant is in the salified form and in the acid form, in the solvent, at the inlet of the bank of extractors.

Advantageously, said extractant is used in the extraction mainly in the salified form, although a certain molar percentage thereof is used in the acid form.

In particular, up to 10 mol% of said extractant used can be in the acid form at the inlet of the first extraction stage.

Several possible procedures can be devised for feeding the bank of extractors with the solvent containing the partially salified extractant, said solvent containing said extractant in the acid form at the outlet of the bank of re-extractors.

In a first variant, after the re-extraction, only part of the extractant is subjected to regeneration (salification). This is done by diverting part of the solvent flow before the regeneration step, said part being recycled directly to the extraction and therefore containing the extractant in the acid form. This part of the solvent flow containing the extractant in the acid form is advantageously mixed with the other part of the solvent flow containing the extractant in the salified form (the part which has undergone regeneration) prior to entering the bank of extractors.

In a second variant, all the extractant is regenerated after the re-extraction. The solvent recycled to the extraction therefore only contains the extractant in the salified form, so it is necessary to introduce an acid, at the inlet of the first extraction stage, in order to generate extractant in the acid form.

Whatever the procedure adopted for introducing the extractant in the partially salified form or partially in the acid form into the extraction, it has been found according to the invention that this partial salification results in an improvement in the efficiency of the conversion process.

The presence of extractant in the acid form appears to limit the development of a secondary reaction.

According to a second feature of the present invention, Applicants have shown that it is possible and advantageous to use a high proportion of extractant in the solvent.

The conversion process according to the invention is advantageously carried out with a solvent containing more than 10% by volume of extractant and advantageously containing from 20 to 25% by volume of extractant.

By using the appropriate amount of modifier in the solvent (solvent=extractant+diluent+modifier), it has proved possible with such proportions of extractant to avoid the detrimental appearance of a third phase (second organic phase).

Those skilled in the art cannot be unaware of the advantages which ensue from this enrichment of the solvent in extractant, which contributes in particular to increased efficiency and to optimization of the equipment and its operation.

According to other features of the process of the invention:
  at the outlet of the extraction, the solvent containing the extractant charged with $NH_3OH^+$ cation is washed with a dilute solution of acid before undergoing the re-extraction, the washing solution advantageously being used to dilute the initial salt solution;
  where possible, the extraction raffinates are used in the extractant regeneration step, thereby reducing the amount of effluents to be discarded; and
  during regeneration of the extractant, after contact with the base, the solvent is advantageously washed, which avoids entraining too much base with said solvent.

The chemical compounds which can be used in the process of the invention are given in detail below, without implying any limitation.

The extractant advantageously consists of an alkylphosphoric acid, preferably di-2-ethylhexylphosphoric acid.

The solvent consists of a mixture of said extractant, a paraffinic diluent and a modifier. Paraffinic diluents which can be used in particular are dodecane, HTP or kerosene. HTP, or hydrogenated tetrapropylene, is a commercial product known to those skilled in the art. It is an industrial mixture of branched dodecanes.

Modifiers which can be used in particular are a heavy alcohol such as octan-1-ol or 2-ethylhexanol, a ketone or tributyl phosphate.

In a preferred variant, the process of the invention is carried out with a solvent containing 20% by volume of di-2-ethylhexylphosphoric acid, 10% by volume of octan-1-ol and 70% by volume of diluent.

Said acid is advantageously converted to its sodium salt during the regeneration step. Its conversion to the potassium salt is not excluded.

Said basic regeneration can be carried out using sodium hydroxide (NaOH), potassium hydroxide (KOH), sodium carbonate ($Na_2Co_3$), sodium bicarbonate ($NaHCO_3$), etc.

Sodium hydroxide or sodium carbonate is generally used, these being common industrial products.

Sodium hydroxide, which can be used in very concentrated form, is preferred among said common industrial products.

When said sodium hydroxide is employed on its own, extractant losses have been observed because of the solubility of the sodium salt of the extractant in the aqueous phase.

In the presence of sodium sulfate, these losses are reduced. It is therefore advantageous to use a solution of sodium hydroxide and sodium sulfate for the regeneration of the extractant.

As indicated above, said sodium sulfate is then advantageously introduced together with the recycled extraction raffinates. It is preferably introduced downstream of the sodium hydroxide, relative to the solvent flow, so as to limit the entrainment of said sodium hydroxide. It thus enables the solvent to be washed after it has been in contact with said sodium hydroxide.

The process of the invention, which advantageously exhibits the various characteristics stated above, has the following advantages over the process described in patent application FR-A-2 206 270:
the efficiency is greater,
the amount of effluents is reduced, and
the equipment has a smaller volume and hence is easier to operate.

To obtain hydroxylamine nitrate from hydroxylamine sulfate, the hydroxylamine cations are extracted from an aqueous solution of hydroxylamine sulfate and re-extracted with an aqueous solution of nitric acid.

Advantageously, for this purpose:
the extraction is carried out by bringing the aqueous solution of hydroxylamine sulfate into contact, in countercurrent, with a solvent containing di-2-ethylhexylphosphoric acid and sodium di-2-ethylhexylphosphate as the extractant in a mixture of HTP and octan-1-ol;
the re-extraction is carried out by bringing said solvent containing said extractant charged with the hydroxylamine cation into contact, in countercurrent, with an aqueous solution of nitric acid; and
said di-2-ethylhexylphosphoric acid is regenerated by being brought into contact, in countercurrent, with an aqueous solution of sodium hydroxide and an aqueous solution of sodium sulfate consisting of the extraction raffinates.

Preferably, in the regeneration, all the di-2-ethylhexylphosphoric acid is converted to its sodium salt, and an acid—nitric acid—is introduced at the inlet of the first extraction stage in order to generate di-2-ethylhexylphosphoric acid.

Advantageously, the solvent containing the charged extractant is washed with dilute nitric acid between the extraction and the re-extraction.

The process of the invention is now described with reference to the two Figures.

In these two Figures, Roman numerals have been used to represent the main steps of said process, namely:
I: the extraction step
II: the washing step
III: the re-extraction step
IV: the regeneration step These various steps are carried out in banks of mixers-decanters.

In addition, the circuit through which the organic phase (solvent) passes has been represented by a double line (=) and the circuits through which aqueous phases pass have been represented by a single line (—).

With reference to FIG. 1:

The initial solution of hydroxylamine salt 1 passes into the bank of extractors I in countercurrent with the solvent 2 containing the extractant for the hydroxylamine cation. Said extractant has been totally salified at IV. According to the invention, the extraction is carried out with a partially salified extractant. In the variant illustrated, this is done by introducing a stream of acid 4.

The solvent charged with $NH_3OH^+$ cation is then washed at II. The washing solution 5—advantageously a slightly acidic aqueous solution—is used to dilute the solution to be extracted, 1.

The washed solvent then passes into the bank of re-extractors III, where it circulates in countercurrent with a solution 3 whose anion is that of the hydroxylamine salt which it is desired to obtain. Said desired hydroxylamine salt is recovered in 9.

After the re-extraction at III, the extractant in the acid form is regenerated (salified) at IV by being brought into contact, in countercurrent, with a basic solution.

In the preferred variant illustrated, the solvent is first brought into contact, in countercurrent, with a solution of sodium hydroxide (NaOH) 7 mixed with a solution of sodium sulfate. This solvent is then washed with a solution of sodium sulfate 6 consisting of the extraction raffinates.

The solution 8 is removed as liquid waste.

As described in detail above, the use of the raffinates 6 is particularly valuable in that it limits the amounts discarded and the losses of hydroxylamine.

Figure 2:
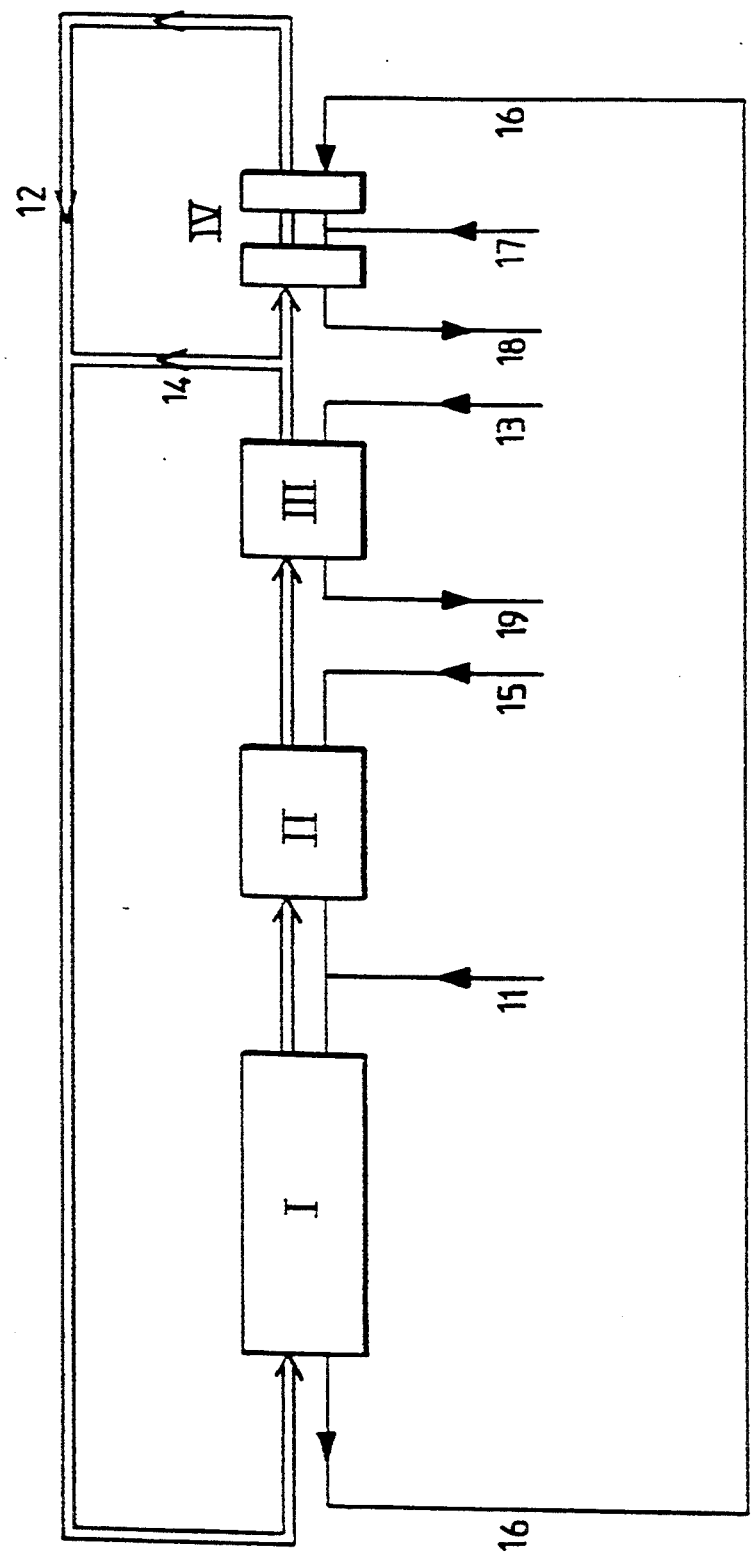
FIG. 2 illustrates a second preferred variant of said process.

With reference to FIG. 2:

The initial solution of hydroxylamine salt 11 passes into the bank of extractors I in countercurrent with the solvent 12+14 containing the extractant for the hydroxylamine cation. Part of said extractant has been salified at IV.

The solvent charged with $NH_3OH^+$ cation is then washed at II.

The washing solution 15—advantageously a slightly acidic aqueous solution—is used to dilute the solution to be extracted, 11.

The washed solvent then passes into the bank of re-extractors III, where it circulates in countercurrent with a solution 13 whose anion is that of the hydroxylamine salt which it is desired to obtain. Said desired hydroxylamine salt is recovered in 19.

After the re-extraction at III, not all the solvent flow containing the extractant in the acid form passes into the regeneration at IV. Part of this flow is diverted at 14 for recycling of the extractant it contains, in the acid form. The other part of said flow is regenerated at IV in a manner analogous to that described with reference to FIG. 1. For said regeneration, a basic solution (advantageously a concentrated solution of sodium hydroxide) is introduced at 17 and the extraction raffinates (solution of $Na_2SO^4$) are introduced at 16.

The solution 18 is removed as liquid waste.

An Example of how to carry out the process of the invention is described in detail below by way of illustration.

The variant described in the Example is the one shown in FIG. 1, where hydroxylamine nitrate is prepared from hydroxylamine sulfate.

The extractant consists of a mixture of sodium di-2-ethylhexylphosphate (0.53±0.01 mol/l) and di-2-ethylhexylphosphoric acid (0.05±0.01 mol/l).

This extractant is dissolved in a mixture of branched dodecane—hydrogenated tetrapropylene, or HTP, distributed by PROCHROM—and octan-1-ol, the proportion by volume of HTP being 7 times that of octanol.

The solvent defined in this way (extractant+diluent-+modifier) is brought into contact, in countercurrent, in a bank of mixers-decanters BI, with an aqueous solution of hydroxylamine sulfate (1): 1 mol/l of flow rate A (A being taken as the reference flow rate in the remainder of this description). The respective flow rates of these solutions are in a ratio org/aq of 4.

In the next step, the solvent is washed, again in countercurrent, in a bank BII, with an aqueous solution of nitric acid (5): 0.2 mol/l of flow rate A, equal to the flow rate of the aqueous solution of hydroxylamine sulfate (1) introduced into the bank BI-After passing through BII, this aqueous solution combines with the flow of hydroxylamine sulfate (1) feeding BI. The solvent leaving BII meets, in countercurrent, in the bank BIII, an aqueous solution of nitric acid (3): 3 mol/l of flow rate 0.7 A. The effluent aqueous solution (9) constitutes the desired product: a solution of hydroxylamine nitrate. The solvent leaving BIII is treated in a bank BIV. It meets, in the first stage, an aqueous solution containing an excess of sodium hydroxide (7), which is therefore capable of converting it totally to the sodium salt, and, in the second stage, an aqueous solution of sodium sulfate (6).

The latter solution (6) is the raffinate from the bank BI. On leaving stage 2 of the bank BIV, it is mixed with a solution of sodium hydroxide (7): 10 mol/l of flow rate 0.28 A, and the whole feeds stage 1 of the solvent regeneration step.

At the outlet of BIV, the aqueous solution (8) is removed as liquid waste. The recycled solvent contains the extractant totally in the form of the sodium salt. A flow rate of 0.11 A of nitric acid (4): 1.5 mol/l, introduced together with the solvent into the bank BI, makes it possible to achieve the desired proportion of di-2-ethylhexylphosphoric acid in the extractant.

The installation comprises banks of mixers-decanters of 8, 4, 3 and 2 stages, respectively, for the extraction I, the washing II, the re-extraction III and the regeneration IV.

The operation runs continuously for 100 hours. The results obtained are as follows:

| Finished product: | aqueous solution (g) containing: $NH_3OHNO_3$ 2.35 mol/l $HNO_3$ 0.22 mol/l |
|---|---| sodium content 4 mg/l, i.e. a molar ratio $Na/NH_3OH$ of $7.4 \cdot 10^5$ sulfate content 3.5 mg/l, i.e. a molar ratio $SO_4/NH_3OH$ of $1.5 \cdot 10^{-5}$

| Loss of hydroxylamine: | |
|---|---|
| raffinate | $NH_3OH^+$ 0.03 mol/l |
| | $NH_2OH$ 0.015 mol/l |
| solvent | $NH_2OH^+$ <0.001 mol/l |

Thus the process according to the invention provides a solution of hydroxylamine nitrate with an excellent degree of purity and a high concentration. The overall efficiency of the operation is 95%.

What is claimed is:

1. A process for the conversion of hydroxylamine sulfate or chloride to hydroxylamine nitrate or formate comprising the steps of
   (a) extraction of the hydroxylamine cation from the initial salt solution by bringing said solution into contact, in countercurrent, with a solvent containing an extractant for said hydroxylamine cation, wherein said extraction is carried out with a partially salified extractant;
   (b) re-extraction of said cation by bringing said solvent containing the extractant charged with said cation into contact, in countercurrent, with an aqueous solution whose anion is that of the hydroxylamine salt which it is desired to obtain; and
   (c) recycling of said solvent containing the extractant, after basic regeneration of the latter.

2. A process according to claim 1 wherein up to 10 mol% of the extractant used is in the acid form at the beginning of the extraction step.

3. A process according to claim 1 wherein, after the re-extraction step, extractant in the acid form is salified during the regeneration step before it is recycled for the extraction step.

4. A process according to claim 3 wherein the extractant is totally salified in said regeneration step, wherein an acid is introduced at the beginning of the extraction step.

5. A process according to claim 1 wherein the proportion of extractant in the solvent is greater than 10% by volume.

6. A process according to claim 1 wherein the solvent containing charged extractant is washed with a dilute solution of acid between the extraction step and the re-extraction step.

7. A process according to claim 1 wherein extraction raffinates are used in the extractant regeneration step.

8. A process according to claim 1 wherein the solvent is washed during regeneration of the extractant, after it has been in contact with base.

9. A process according to claim 1 wherein the extractant comprises a solution of an alkylphosphoric acid.

10. A process according to claim 1 wherein the solvent comprises a mixture of said extractant, a paraffinic diluent selected from the group consisting of dodecane, HTP or kerosene, and a modifier selected from the group consisting of heavy alcohols, ketones and tributyl phosphate.

11. A process according to claim 10 wherein said solvent contains 20% by volume of di-2-ethylhexylphosphoric acid, 10% by volume of octan-1-ol and 70% by volume of diluent.

12. A process according to claim 1 for the conversion of hydroxylamine sulfate to hydroxylamine nitrate, wherein:
   (a) the extraction step is carried out by bringing an aqueous solution of hydroxylamine sulfate into contact, in countercurrent, with a solvent containing di-2-ethylhexylphosphoric acid and sodium di-2-ethylhexylphosphate as the extractant in a mixture of HTP and octan-1-ol;
   (b) the re-extraction step is carried out by bringing said solvent containing said extractant charged with the hydroxylamine cation into contact, in countercurrent, with an aqueous solution of nitric acid; and
   (c) said di-2-ethylhexylphosphoric acid is regenerated by being brought into contact, in counter-current, with an aqueous solution of sodium hydroxide and an aqueous solution of sodium sulfate consisting of the extraction raffinates.

13. A process according to claim 5 wherein the proportion of extractant in the solvent is between 20 and 25% by volume.

14. A process according to claim 9, wherein the extractant is di-2-ethylhexylphosphoric acid.

15. A process according to claim 10, wherein the heavy alcohols include octan-1-ol and 2-ethylhexanol.

16. A process according to claim 15 wherein said solvent contains 20% by volume of di-2-ethylhexylphosphoric acid, 10% by volume of octan-1-ol and 70% by volume of diluent.

17. A process according to claim 3 wherein the extractant is partially salified in said regeneration step.

* * * * *